United States Patent
Rizzo

(10) Patent No.: US 10,018,047 B2
(45) Date of Patent: Jul. 10, 2018

(54) METHODS OF ROUGHING AND FINISHING ENGINE HARDWARE

(71) Applicant: United Technologies Corporation, Hartford, CT (US)

(72) Inventor: John P. Rizzo, Vernon, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 674 days.

(21) Appl. No.: 14/559,023

(22) Filed: Dec. 3, 2014

(65) Prior Publication Data
US 2016/0176000 A1  Jun. 23, 2016

Related U.S. Application Data

(60) Provisional application No. 61/915,056, filed on Dec. 12, 2013.

(51) Int. Cl.
*B24B 1/00* (2006.01)
*F01D 5/02* (2006.01)
*B23P 15/00* (2006.01)
*B24B 5/01* (2006.01)
*F01D 5/34* (2006.01)

(52) U.S. Cl.
CPC .............. *F01D 5/02* (2013.01); *B23P 15/006* (2013.01); *B24B 1/00* (2013.01); *B24B 5/01* (2013.01); *F01D 5/34* (2013.01); *B23B 2215/04* (2013.01); *F05D 2230/10* (2013.01)

(58) Field of Classification Search
CPC ..... F01D 5/02; F01D 5/34; B24B 5/01; B24B 1/00; B23P 15/006; B23B 2215/04; F05D 2230/10
See application file for complete search history.

(56) References Cited

U.S. PATENT DOCUMENTS

| | | | | |
|---|---|---|---|---|
| 4,329,175 A * | 5/1982 | Turner | ...................... | B22F 5/04 416/213 R |
| 5,430,936 A * | 7/1995 | Yazdzik, Jr. | .......... | B23P 15/006 29/558 |
| 6,536,109 B2 * | 3/2003 | Berthelet | .................. | B24B 1/04 29/889.1 |
| 7,107,886 B2 * | 9/2006 | Hill | ........................... | B23B 1/00 29/889.23 |
| 7,303,461 B1 * | 12/2007 | Campomanes | ........... | B24B 1/00 451/214 |
| 7,699,685 B1 * | 4/2010 | Gerstner | ............... | B24B 19/009 451/10 |
| 7,708,619 B2 * | 5/2010 | Subramanian | ............ | B24B 1/00 451/11 |

FOREIGN PATENT DOCUMENTS

CN  105458871 A  *  4/2016

OTHER PUBLICATIONS

English translation of CN105458871.*

* cited by examiner

*Primary Examiner* — Jun Yoo
(74) *Attorney, Agent, or Firm* — Snell & Wilmer, L.L.P.

(57) ABSTRACT

Powder metal alloy engine hardware components may be finished using a combination of roughing and grinding techniques. An engine component may be rough ground with a grinding wheel at a relatively high rate of material removal. The engine hardware component may be semi-finished using a turning process. The engine hardware component may be finished using a grinding wheel.

10 Claims, 5 Drawing Sheets

METHODS OF ROUGHING AND FINISHING ENGINE HARDWARE

CROSS-REFERENCE TO RELATED APPLICATIONS

This application is a nonprovisional of, and claims priority to, and the benefit of U.S. Provisional Application No. 61/915,056, entitled "METHODS OF ROUGHING AND FINISHING ENGINE HARDWARE," filed on Dec. 12, 2013, which is hereby incorporated by reference in its entirety.

FIELD

The present disclosure relates generally to gas turbine engines. More particularly, the present disclosure relates to roughing and finishing engine hardware for gas turbine engines.

BACKGROUND

Various components in gas turbine engines, e.g. turbine disks and integrally bladed rotors, may be manufactured from powder metal alloys. Powder metal alloy components may be difficult to machine. A significant portion of the cost of powder metal alloy components may be a result of the long machining time required to finish the components, for example by turning.

SUMMARY

A method of finishing an engine hardware component may comprise rough grinding the engine hardware component. The method may comprise semi-finishing the engine hardware component using a turning process. The method may comprise finishing the engine hardware component.

A method of manufacturing an engine hardware component may comprise forming the engine hardware component from a powder metal alloy. The method may comprise rough grinding the engine hardware component. The method may comprise turning the engine hardware component.

A method of finishing a turbine disk may comprise removing material from the turbine disk by a first process at a rate greater than 10 in$^3$/min (160 cm$^3$/min). The method may comprise removing material from the turbine disk by a second process.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Systems and methods are disclosed herein for roughing and finishing engine hardware, such as turbine disks and integrally bladed rotors (IBR) in high pressure compressors. Turbine disks and IBRs, as well as other engine hardware, may comprise a powder metal alloy. A blended fine powdered material may be compacted into a desired shape, then sintered by heating the material in a controlled atmosphere. However, powder metal alloys may be difficult to machine. The machining time may be a large portion of the cost in manufacturing the engine hardware. In order to increase the material removal rate and minimize machining time, engine hardware may be rough ground using vitrified ceramic or superabrasive wheels, and then finish turned using ceramic, carbide, or cubic boron nitride (CBN) inserts. In various embodiments, the engine hardware may be finish ground after turning in order to decrease a surface roughness beyond that capable by turning. Rough grinding prior to turning may reduce the production cycle time of powder metal alloy components. Additionally, rough grinding prior to turning may reduce the manual labor required to change between multiple tools used during turning, may reduce the presence of burrs following machining, and may reduce residual stress in the component surface.

Figure 1:
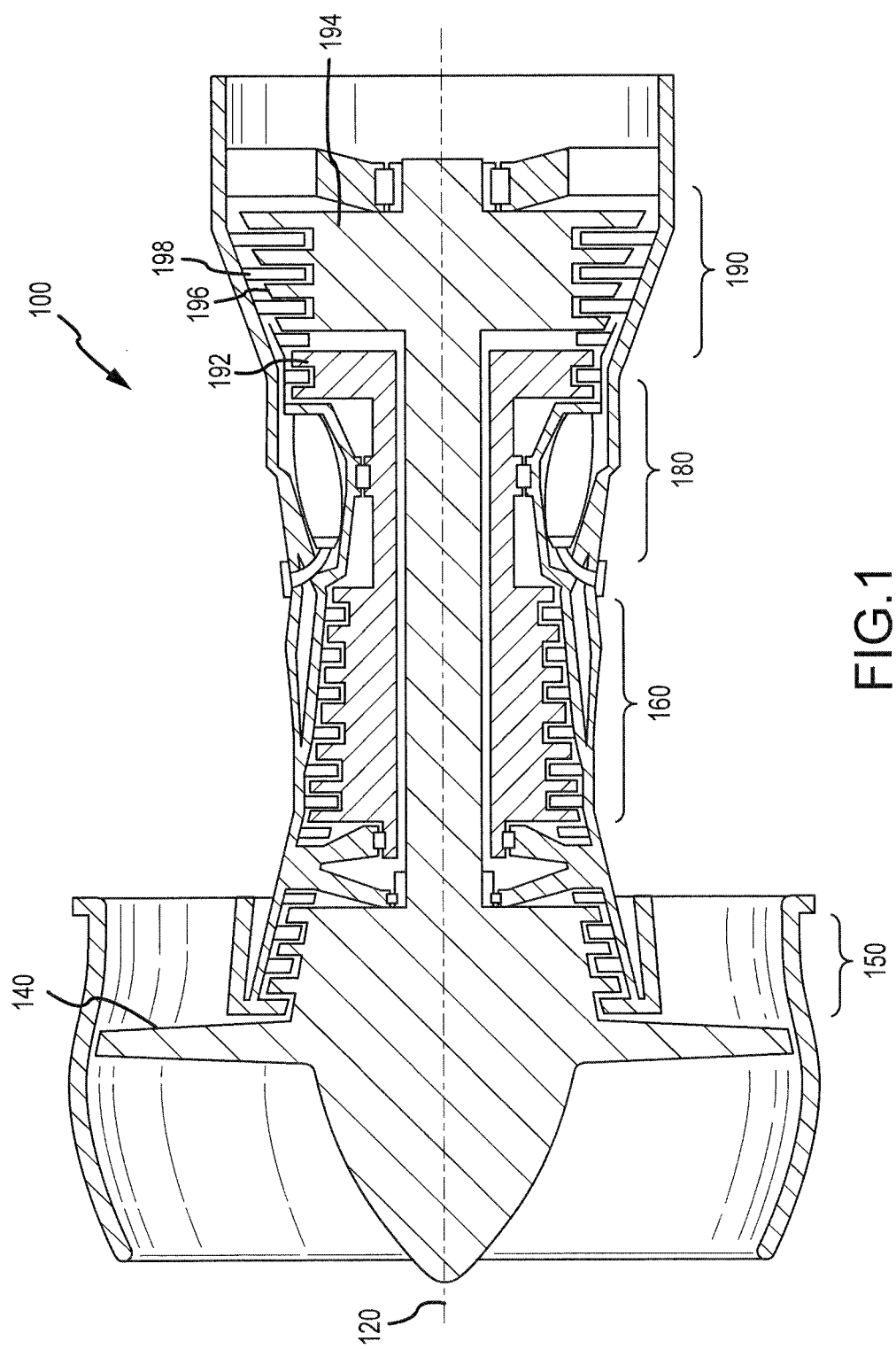
FIG. 1 illustrates a schematic view of a gas turbine engine in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and a turbine section 190. Air compressed in the compressor sections 150, 160 may be mixed with fuel and burned in combustion section 180 and expanded across turbine section 190. Turbine section 190 may include high pressure rotors 192 and low pressure rotors 194, which rotate in response to the expansion. Turbine section 190 may comprise alternating rows of rotary airfoils or blades 196 and static airfoils or vanes 198. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
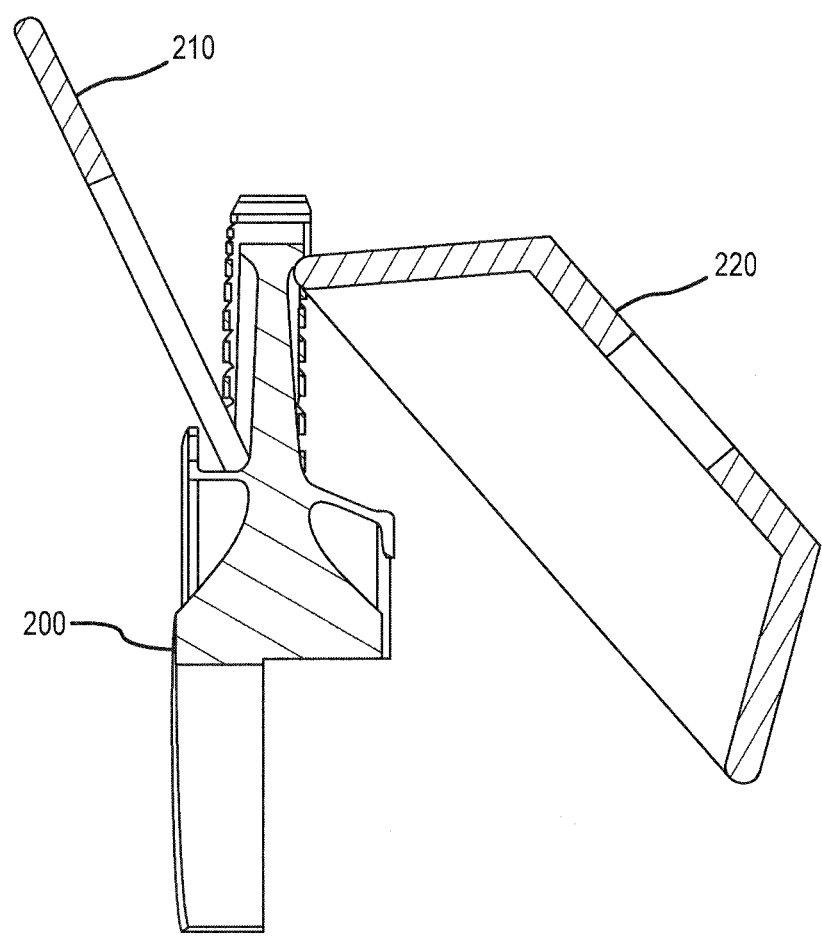
FIG. 2 illustrates a section view of a turbine disk being rough ground with grinding wheels in accordance with various embodiments.

Referring to FIG. 2, a partial section view of a turbine disk 200 is illustrated according to various embodiments. In various embodiments, turbine disk 200 may comprise a powder metal alloy. For example, turbine disk 200 may comprise a powder nickel alloy such as IN®-100, IN®-718, or RENE® 97. Turbine disk 200 may be rough ground using grinding wheels 210, 220. As used herein, rough grinding may refer to grinding a surface down to about 0.050 inches-0.100 inches (0.127 cm-0.254 cm) $R_a$, where $R_a$ represents the arithmetic average of the absolute values of the vertical deviations of the surface roughness profile from the mean line. As used herein, semi-finishing may refer to smoothing a surface to between about 0.030 inches-0.050 inches (0.076 cm-0.127 cm) $R_a$, and finishing may refer to smoothing a surface to less than about 0.030 inches (0.127 cm) $R_a$.

In various embodiments, grinding wheels 210, 220 may comprise a ceramic grain which may contact turbine disk 200. In various embodiments, grinding wheels 210, 220 may comprise a ceramic aluminum oxide, diamond, and/or cubic boron nitride (CBN). In various embodiments, rough grinding may achieve material removal rates of at least about 10 $in^3$/min-15 $in^3$/min (160 $cm^3$/min-250 $cm^3$/min). In contrast, in various embodiments turning may be limited to removal rates of about 3 $in^3$/min (50 $cm^3$/min) or less.

Figure 3:
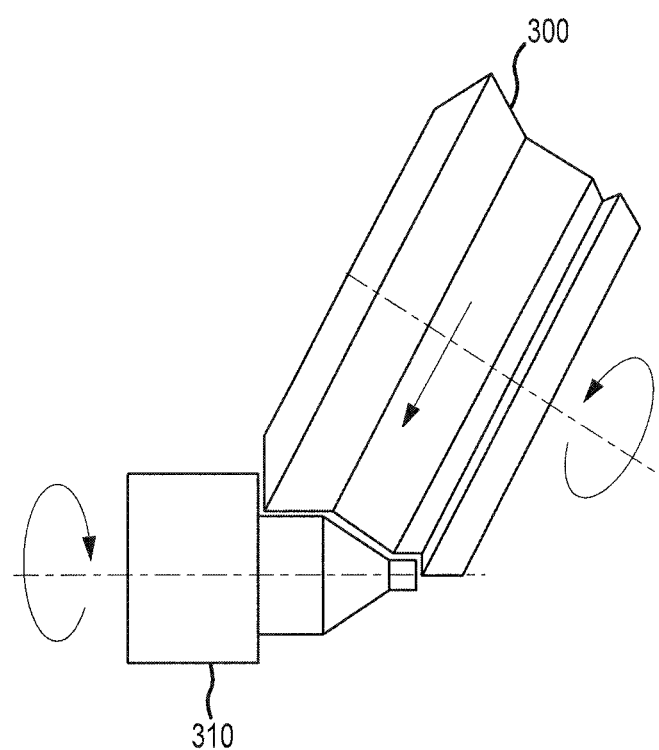
FIG. 3 illustrates a plunge grinding wheel in accordance with various embodiments.

Referring to FIG. 3, a grinding wheel 300 for plunge grinding is illustrated according to various embodiments. In various embodiments, rough grinding may comprise plunge grinding. In plunge grinding, both grinding wheel 300 and the component 310 may be rotating. However, as opposed to other forms of outside diameter grinding, grinding wheel 300 may make continuous contact with a single point of component 310 instead of traversing relative to component 310. This may assist with increasing the material removal rate.

Figure 4:
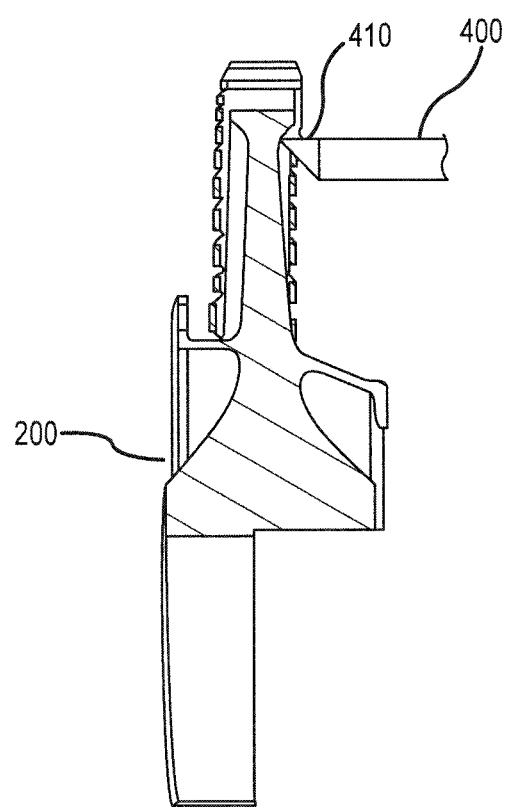
FIG. 4 illustrates a section view of a turbine disk during a turning process in accordance with various embodiments.

Referring to FIG. 4, turbine disk 200 may be semi-finished using a turning process. Turning may comprise a process in which a cutting tool 400, such as a non-rotary tool bit, describes a helical toolpath by moving more or less linearly while turbine disk 200 rotates. In various embodiments, cutting tool 400 may comprise an insert 410. In various embodiments, insert 410 may comprise at least one of vitrified ceramic, carbide, and cubic boron nitride. In various embodiments, turbine disk 200 may be turned until a surface roughness of about 0.030 inches $R_a$ is achieved. However, in various embodiments, turning may be utilized for final finishing, and the surface roughness may be less than about 0.030 inches $R_a$. In various embodiments, after turning is complete, turbine disk 200 may be finish ground using grinding wheels to achieve a surface roughness less than about 0.030 inches $R_a$.

Figure 5:
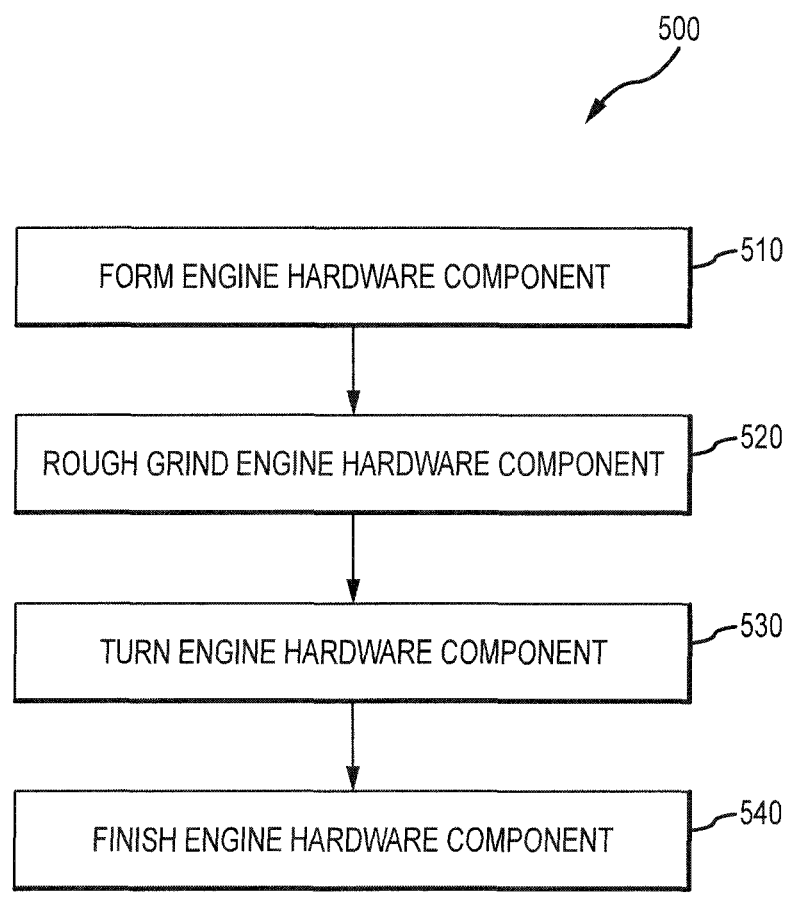
FIG. 5 illustrates a flow diagram of a process for manufacturing a component in accordance with various embodiments.

Referring to FIG. 5, a process 500 for manufacturing an engine hardware component is illustrated according to various embodiments. The process 500 may include forming an engine hardware component from a powder metal alloy (step 510). In various embodiments, the engine hardware component may comprise at least one of a turbine disk and an IBR for a high pressure compressor. The process 500 may include rough grinding the engine hardware component (step 520). In various embodiments, rough grinding may comprise plunge grinding. In various embodiments, the process 500 may comprise semi-finishing the engine hardware component using a turning process (step 530). The process may further comprise finishing the engine hardware component (step 540). In various embodiments, finishing may comprise turning. However, in various embodiments, finishing may comprise grinding the hardware component.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35

U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of finishing an engine hardware component comprising:
   rough grinding the engine hardware component, wherein the rough grinding removes at least 10 in$^3$/min of material from the engine hardware component;
   semi-finishing, after completion of the rough grinding, the engine hardware component in a turning process, wherein the rough grinding removes material from the engine hardware component at a rate greater than the semi-finishing; and
   finishing, after completion of the semi-finishing, the engine hardware component, wherein the finishing produces a surface roughness of less than 0.030 inches $R_a$,
   wherein the engine hardware component is an integrally bladed rotor, and
   wherein the integrally bladed rotor comprises a powder nickel alloy.

2. The method of claim 1, wherein the rough grinding comprises plunge grinding.

3. The method of claim 1, wherein the finishing comprises grinding the engine hardware component.

4. The method of claim 1, wherein the finishing comprises turning the engine hardware component.

5. The method of claim 1, wherein the rough grinding comprises grinding the engine hardware component with a grinding wheel comprising a ceramic aluminum oxide.

6. A method of manufacturing an engine hardware component comprising:
   forming the engine hardware component from a powder metal alloy,
      wherein the engine hardware component is an integrally bladed rotor, and
      wherein the integrally bladed rotor comprises a powder nickel alloy;
   rough grinding the engine hardware component, wherein the rough grinding removes at least 10 in$^3$/min of material from the engine hardware component; and
   turning, after completion of the rough grinding, the engine hardware component, wherein the rough grinding removes material from the engine hardware component at a rate greater than the turning.

7. The method of claim 6, wherein the rough grinding comprises plunge grinding.

8. The method of claim 6, wherein the turning comprises semi-finishing the engine hardware component.

9. The method of claim 6, further comprising finishing the engine hardware component.

10. The method of claim 9, wherein the finishing comprises grinding the engine hardware component.

* * * * *